United States Patent
Greene

(10) Patent No.: US 6,611,748 B2
(45) Date of Patent: Aug. 26, 2003

(54) ENGINE SYNCHRONIZATION SYSTEM

(75) Inventor: Leonard M. Greene, White Plains, NY (US)

(73) Assignee: Safe Flight Instrument Corporation, White Plains, NY (US)

( * ) Notice: Subject to any disclaimer, the term of this patent is extended or adjusted under 35 U.S.C. 154(b) by 119 days.

(21) Appl. No.: 09/755,044

(22) Filed: Jan. 8, 2001

(65) Prior Publication Data
US 2002/0091480 A1 Jul. 11, 2002

(51) Int. Cl.$^7$ .......................... G06F 15/48; B64C 11/50; F02B 73/00
(52) U.S. Cl. .......................... 701/100; 701/99; 416/35; 700/304
(58) Field of Search .......................... 701/99, 100, 110; 416/34, 35; 700/304; 60/224, 226.1, 39.15, 39.24, 700, 702; 361/244, 243; 327/141, 231

(56) References Cited

U.S. PATENT DOCUMENTS

| | | | | |
|---|---|---|---|---|
| 3,309,871 A | * | 3/1967 | Kelly | 60/97 |
| 3,367,110 A | * | 2/1968 | Leeson, Jr. | 60/97 |
| 3,689,175 A | * | 9/1972 | Hartzell et al. | 416/34 |
| 4,245,955 A | * | 1/1981 | Lambertson | 416/34 |
| 4,259,838 A | * | 4/1981 | McCollum, Jr. et al. | 60/224 |
| 4,410,948 A | * | 10/1983 | Doniger et al. | 364/431.01 |
| 4,741,165 A | * | 5/1988 | Kobus | 60/700 |
| 4,875,168 A | * | 10/1989 | Martin | 364/431.01 |
| 5,224,340 A | * | 7/1993 | Snow | 60/224 |
| 5,291,410 A | * | 3/1994 | Metz | 364/431.07 |

* cited by examiner

Primary Examiner—Tan Q. Nguyen
Assistant Examiner—Dalena Tran
(74) Attorney, Agent, or Firm—Dennison, Schultz & Dougherty

(57) ABSTRACT

An engine synchronization system for a pair of turbo jet engines in a twin jet aircraft includes a subsystem for selecting a power output, a signal generator for producing a first output signal in response to the speed of a first engine and a signal generator for producing a second output signal in response to the speed of a second engine. The system also includes a selector for selecting the fan speed or compressor speed of the engines as a control. The system incorporating an averaging device for calculating the average of the engine speeds and causing the servo driven throttle controller to retard the faster and advance the slower throttles toward the average. The engine synchronization system also includes a split shaft assembly including first and second output shafts which are disposed on a common axis. Each of the output shafts is locked to a servo motor and are free to rotate with respect to one another. The servo driven throttle control also includes a pair of sprag clutches with one of the clutches disposed between each of the shafts and a manual throttle control. The sprag clutch allows the manual throttle control to rotate about the shaft without rotating the shaft and for providing authority to the manual throttle control.

6 Claims, 5 Drawing Sheets

ENGINE SYNCHRONIZATION SYSTEM

FIELD OF THE INVENTION

This invention relates to an engine synchronization system and more particularly to an engine synchronization system for the turbo jet engines in a twin-engine aircraft.

BACKGROUND FOR THE INVENTION

It is well known that the synchronization of the speed between the power plants of twin-engine aircraft offer a number of advantages. For example, the synchronization of the engines reduces or eliminates crew and passenger fatigue due to the vibration caused by non-synchronized engines. It is also believe that engine synchronization may increase the economy of the aircraft and the useful life of the engines.

In the past, pilots have tried to obtain synchronization by careful engine control relying on their ears for determining when the "on speed" conditions were reached. More recently, pilots have had the aid of automatic synchronization systems as disclosed in an article entitled "Flying in Step" in the Mar. 21, 1952 issue of Flight.

In modern, twin-jet engine aircraft, a pilot may manually control the power by means of the throttle control lever or quadrant. In some aircraft, the throttle control is integrated with the flight control system and, under normal flight conditions, controlled thereby. For example, one such system is disclosed in my U.S. Pat. No. 5,613,652 entitled "Aircraft Auto Throttle System" which issued on Mar. 25, 1997, and is incorporated herein in its entirely by reference.

It is now believed that there may be a significant commercial demand for an improved engine synchronization system which can be incorporated in an autothrottle system. One advantage of the system in accordance with the present invention resides in the use of a split shaft assembly and a sprag clutch. The split shaft assembly allows one portion of the shaft to rotate independently of the other portion. The sprag clutch allows the manual throttle controls to be on the same shafts and to move without rotation of the shaft. At the same time, the manual control has authority over a possible runaway or locked servo motor.

It is believed that the systems, in accordance with the present invention, will accurately synchronize the turbojet engines in a twin-jet aircraft, reduce vibration, improve crew and passenger comfort, increase engine efficiency and the useful life of the engines. In addition, such systems are relatively inexpensive to add to autothrottle controls, durable and reliable. In addition, the engine synchronization system in accordance with the present invention has essentially zero play and provides the minute adjustment that is required for turbines which rotate at about 20,000 rpm.

BRIEF SUMMARY OF THE INVENTION

In essence, the present invention contemplates an engine synchronization system for twin turbojet engines. The engine synchronization system includes means for selecting a power output, means for producing a first output signal in response to the speed of a first engine and means for producing a second output signal in response to the speed of a second engine. The system also includes averaging means for averaging the speed of the engines and means for detecting any differences in the averaging speed and the speed of each engine. A servo driven throttle control is provided for advancing and retarding the speed of each engine to match the average speed to thereby synchronize the engines.

The servo driven throttle control includes a first and a second servo motor and a split shaft assembly including first and second output shafts which are disposed on a common axis. The first of the output shafts is operatively connected or locked to the first of the servo motors while the second of the output shafts is connected to or locked to the second of the servo motors. Each of the shafts are free to rotate independently of the other. The servo driven throttle control also incorporates a pair of sprag clutches with one of the clutches disposed between each of the shafts which allows a manual throttle control to rotate about the shaft without rotating the shaft and for providing authority to the manual throttle control. The shafts are then driven by the servo motors and control the engine speed through the clutches.

It should be recognized that the engine synchronization system, in accordance with the present invention, may be implemented in analogue, digital or programmed technology utilizing apparatus and techniques which are well within the skill of the art in view of the teachings which follow hereinafter. However, the present invention is described with respect to exemplary embodiments employing a suitable programmed micro computer or the like.

The invention will now be described in connection with the accompanying drawings.

DESCRIPTION OF THE PREFERRED EMBODIMENTS OF THE INVENTION

Figure 1:
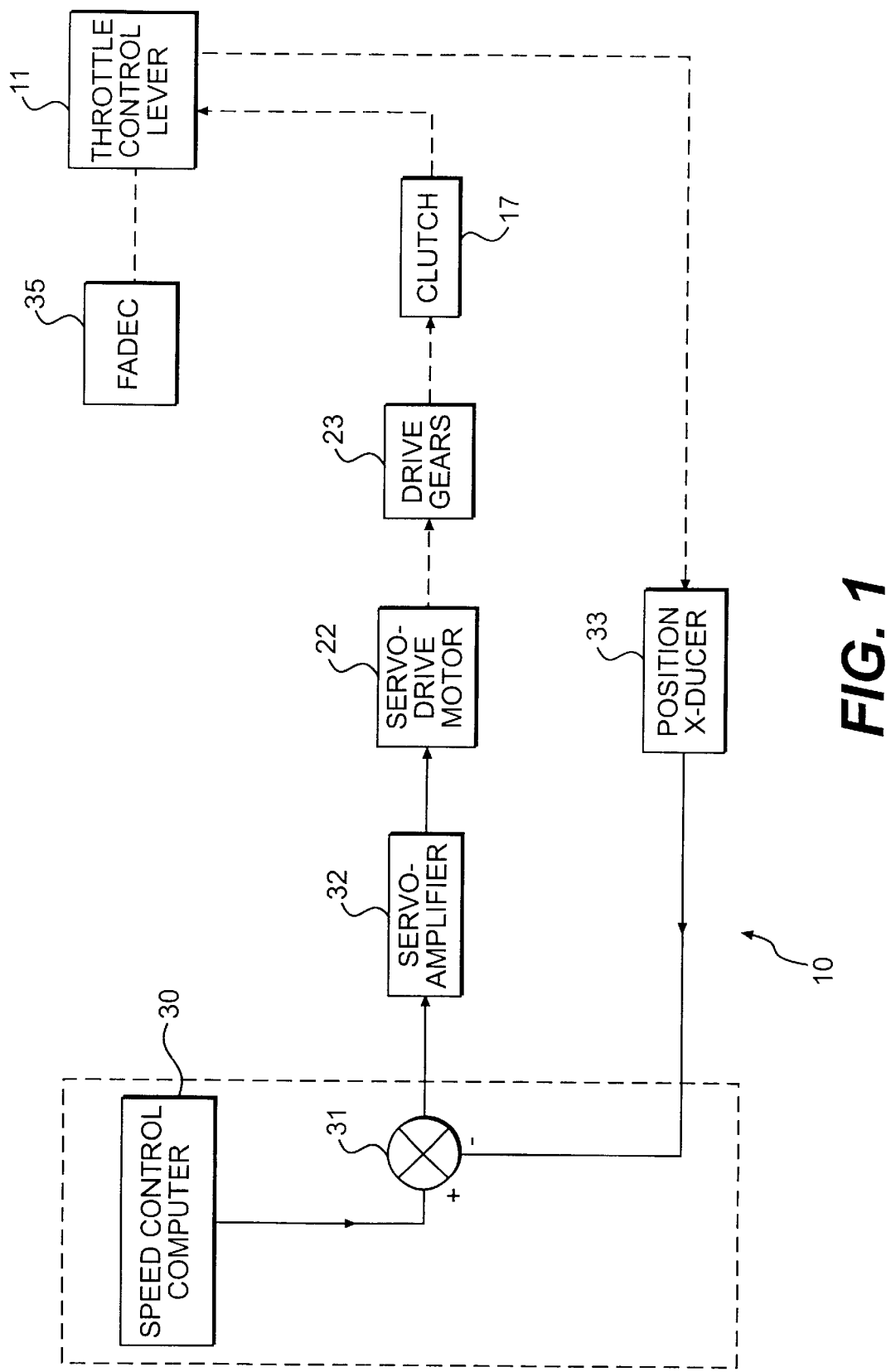
FIG. 1 is a block diagram of a prior art aircraft auto throttle system in accordance with my aforementioned U.S. patent.

An engine synchronization system in accordance with the present invention may be incorporated in an auto throttle system as for example, a prior art auto throttle system as shown in FIG. 1. As shown therein, the auto throttle 10 includes a speed control computer 30 which is connected to a servo amplifier 32 and servo motor 22. The servo motor 22 drives a drive gear 23 in response to the amplified signal from the computer 30. This speed control computer is of a conventional design. The drive gears 23 then are connected to a throttle control lever 11 through a clutch 17 for advancing or retarding the throttle or throttles in response to a command from the speed control computer 30. In modern jet aircraft, the engine control may be accomplished electronically or by fiber optics. In such systems, sometimes referred to "fly by wire" or full authority digital engine control (FADEC) 35, the position of the power levers is sensed by a rotary component and a signal is then transmitted to the full authority digital engine control or to the speed control computer 30.

Figure 1A:
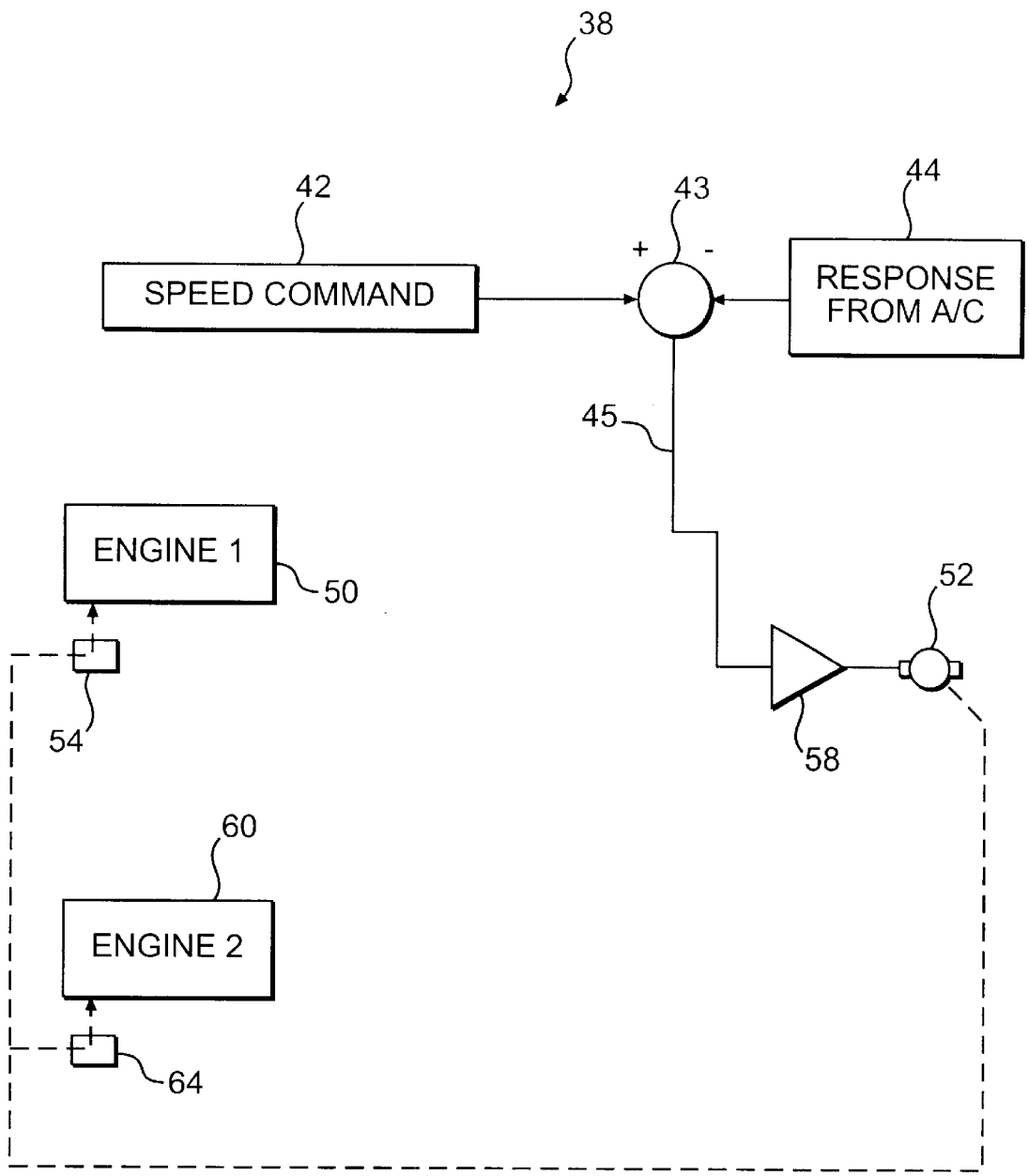
FIG. 1a is a functional block diagram of a prior art aircraft autothrottle system.

As illustrated in FIG. 1a, an autothrottle system 38 or autothrottle computer includes a speed command input 42. This speed command input 42 generates a signal in response to a selected airspeed and the signal is fed to a summoning device 43. A second signal which corresponds to the actual or indicated airspeed of the aircraft is generated by an output device 44. The two signals are compared and the summoning device 43 produces a signal to increase or decrease the power output of the engines 50 and 60.

The signal 45 is amplified by an amplifier 58 and fed to a servomotor 52. The servomotor 52 drives servodriven throttle controls 54 and 64 to increase or decrease the power of engines 50 and 60 respectively in response to the amplified signal from amplifier 58

Figure 2:
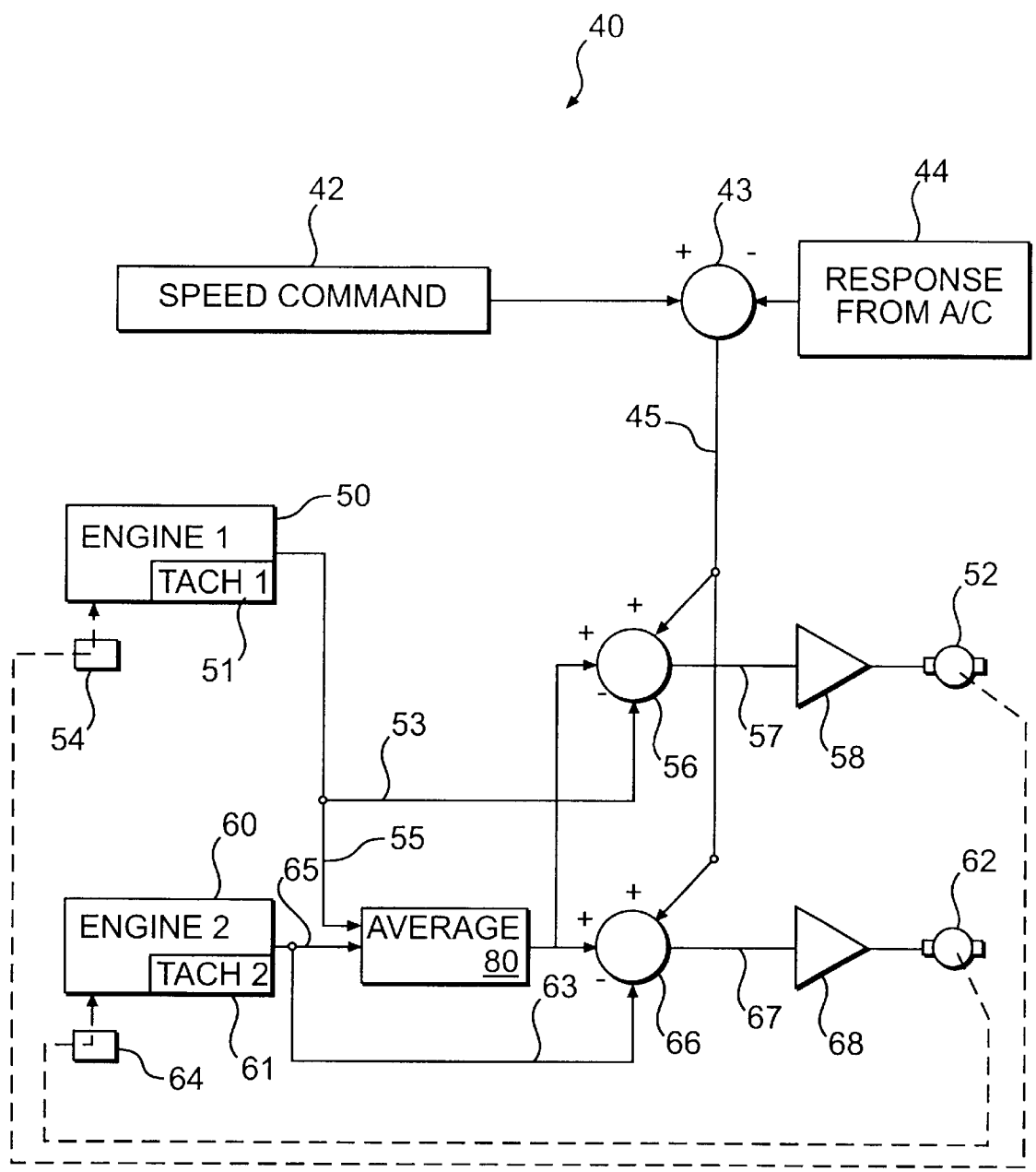
FIG. 2 is a functional block diagram of an engine synchronization system in accordance with the present invention; and, FIG. 3 is a schematic illustration of a control for use in connection with the present invention; and, FIG. 4 is a cross sectional view which illustrates a split shaft assembly for advancing and retarding the speed of each engine in a twin engine aircraft.

The present invention, which is illustrated in connection with FIGS. 2 and 3, contemplates an engine synchronization system for the turbo jet engines in a twin jet aircraft. As shown in FIG. 2, an engine synchronization system 40 incorporates an automatic throttle computer. This automatic throttle computer includes a speed control function or speed command input 42 (indicated air speed or other command). The speed command input 42, or other command, generates a signal which corresponds to the power output of the engines. This power output of the engines corresponds to the desired or selected air speed.

A signal from the speed command input 42 which corresponds to a selected airspeed is fed to a summoning device 43 or other comparison means. A second signal from an aircraft output 44 which corresponds to the actual or indicated airspeed of the aircraft is generated in a conventional manner and fed to the summoning device 43. The two signals are compared and the summoning device 43 produces a signal to increase or decrease the power output of the engines.

The system 40 also includes an individual servo motor and servo driven throttle control for each engine. For example, the power of a first engine 50 is advanced or retarded by a servo motor 52 and a servo driven throttle control 54. The increase or decrease in power is in response to a signal from a second summing device 56 as amplified by an amplifier 58.

In a similar manner, the power from a second engine 60 is advanced or retarded by a servo motor 62 and a servo driven throttle control 64. The power of the second engine is increased or decreased in response to a signal from a third summing device 66 as amplified by a amplifier 68.

Means such as a tachometer 51 produce signals which are indicative of the fan speed or compressor speed of engines 50 and 60, respectively. The signals produced are fed to the summing devices 56 and 66, by leads 53 and 63. These signals are also fed to an averaging device 80 by means of leads 55 and 65.

In a first embodiment of the invention, each of the engines 50 and 60 are driven by a single automatic throttle computer. This computer can accept a signal which determines whether the fan speed N1 or compressor speed N2 must be matched. If, for example, N1 is commanded and N1 synchronization is desired, it is a simple matter to have the servo motor set both of the throttles to the command N1, thus achieving synchronization.

In operation, a signal from the summing device 43 is fed to the summing devices 56 and 66, by a lead 45. This signal may, for example, call for an increase in the power output of the engines 50 and 60. Signals from the tachometers 51, 61 are fed to the summing devices 56 and 66, respectively, and from the devices 56 and 66 to the amplifiers 58 and 68 by means of leads 57 and 67. An averaging device 80 continuously calculates the average of the engine speeds, either fan speed or compressor speed and cause the servo motors to retard the faster and advance the slower throttles toward the average.

Figure 3:
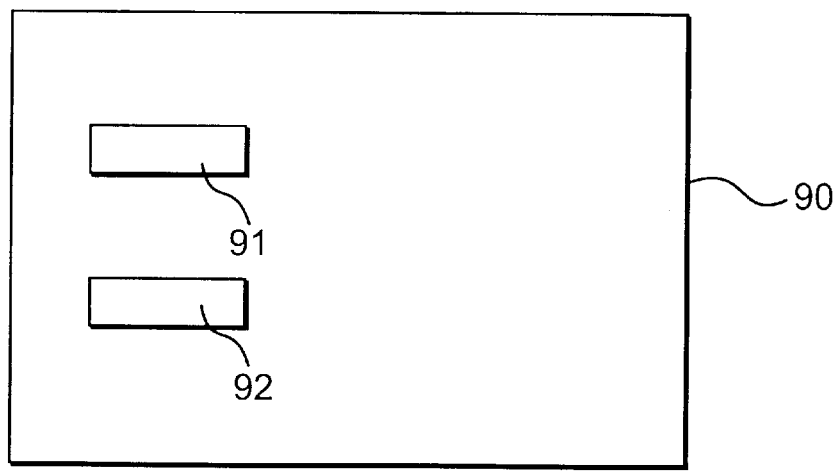

FIG. 3 is a schematic illustration of a selector 90 which allows an individual to select compressor speed 91 or fan speed 92 as the control.

Figure 4:
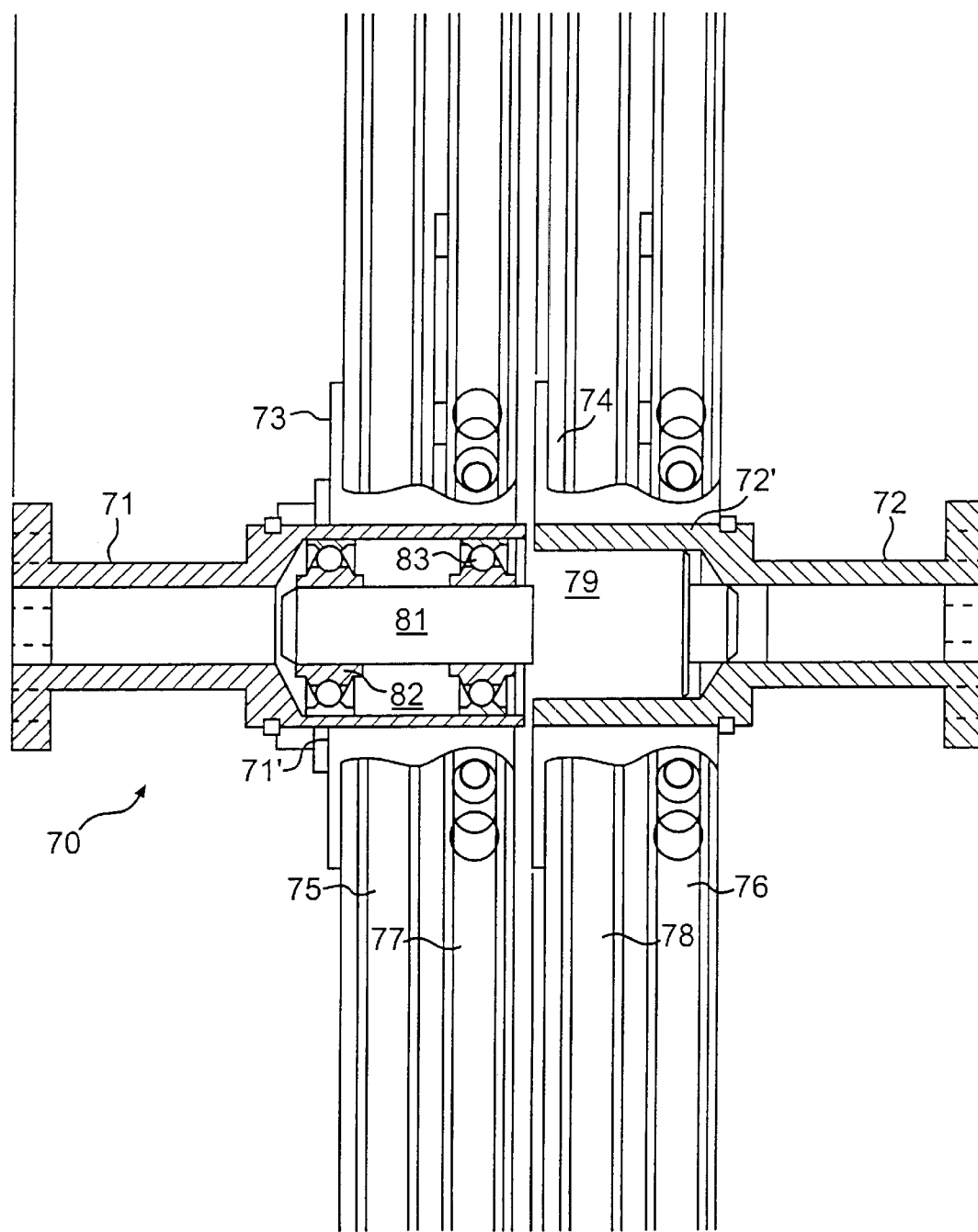

FIG. 4 illustrates a split shaft assembly for synchronization of the engines in a twin engine aircraft in accordance with a preferred embodiment of the invention. As illustrated therein, the independent control of two engines is achieved by actuating the throttle by twin servo drives through a pair of conventional sprag clutches such as those which are available from Safe Flight Instrument Corporation of White Plains, N.Y.

A split shaft is required when dictated by space consideration, i.e., the two clutches must be so close to one another as to preclude the use of completely independent shafts. It is also contemplated that other types of clutches may be used.

As shown in FIG. 4, a split shaft assembly 70, includes first and second portions or output shafts 71 and 72 which are operatively connected to a left and right servo motor or drive (not shown in FIG. 4) a pair of clutches 73 and 74 are operatively connected to the shafts 71 an 72 and rotate the sheaves 75, 76, 77 and 78 for controlling the engine speed of each engine in a conventional manner. As illustrated, the shaft 72 includes an outer portion 72' which includes an inner spline which meshes with an outer spline on an inner shaft 79. The inner shaft 79 also includes an extension 81 of reduced diameter, while the outer portion 71' is bored out to accept a pair of bearings 82 and 83 which fit over the extension 81. This arrangement with suitable spacers provides the necessary strength and stiffness to allow the assembly 70 to be mounted on and supported by the servo drives at both ends with no additional support. The servo drives are in turn mounted on an autopower superstructure (not shown) to provide lateral and transverse stability.

The sprag clutches utilized in the present invention are of conventional design and operate in a conventional manner. For example, each sprag clutch includes three members, an output member operatively connected to an engine, a servo member connected to a servo motor and a control member. The sprags connect the control member to the servo motor and to the output member. Then when the servo is driving the system, multiple pairs of opposed sprags are lodged in a race which is between the servo member and the output member. In effect, the pairs of sprags connect the two members.

Then, when the servo motor operates through the sprags to an output member, the servo drives the engine directly independently of the manual throttle control. It should be recognized that the clutches also include a sheave and a cable attached to the sheave. Then when a pilot puts force on the control member, it releases the sprags and a pilot has control of the throttle.

In prior art throttle controls a single servo was used to drive two clutches. Then, if the engines were not trimmed, the pilot trimmed the engines with the manual throttle controls. However for automatic trimming as done in accordance with the present invention, two servos, one for each engine are used. Then, because all are on the same center line, a split shaft or shaft inside of a second shaft with bearings allows one shaft to rotate with respect to the other.

For example, if a pilot selects a speed which requires 86% of N2 (thrust) and the left engine is at 85% and the right engine at 87%, the left servo will bring the left engine up to 86% while the right servo reduces the thrust to 86% to thereby synchronize the engines.

While the invention has been described in connection with its preferred embodiments, it should be recognized that changes and modifications can be made therein without departing from the scope of the appended claims.

What is claimed is:

1. An engine synchronization system for a pair of turbo jet engines which produce a power output in a twin-engine aircraft comprising means for selecting a power output, means for producing a first output signal in response to the speed of a first engine, means for producing a second output signal in response to the speed of said second engine, averaging means for averaging the speed of the engines and means for detecting differences in the average speed and the speed of each engine, and a servo driven throttle control, said servo driven throttle control comprising a first and a second servo motor and a shaft assembly including first and second output shafts locked to said first of said servo motors and with said second of said output shafts locked to said second of said servo motors and wherein said output shafts are free to rotate with respect to one another for advancing and retarding the speed of each engine to match the average speed to thereby synchronize the speed of the engines.

2. An engine synchronization system for a pair of turbo jet engines in a multi-engine aircraft wherein each of the turbo jet engines includes a fan and a compresser, said engine synchronization system comprising an automatic throttle computer, an individual servo motor and servo driven throttle control for each engine, and a split shaft assembly including first and second output shafts disposed on a common axis with a first of said output shafts locked to a first of said individual servo motors and to a first of said throttle controls and with said second of said output shafts operatively connected to a second of said individual servo motors and to a second of said throttle controls and wherein said output shafts are free to rotate with respect to one another, each of said servo driven throttle controls being driven by said automatic throttle computer, and sensing means for sensing the speed of each engine and means for calculating the average of the engine speeds and cause the servo motors to retard the throttle control of the faster of the engines and advance the throttle control of the slower of the engines; to thereby synchronize the engines.

3. An engine synchronization system according to claim 2 which includes a summing device and an amplifier for controlling each of said servo motors.

4. An engine synchronization system according to claim 2 in which said sensing means senses the fan speed of each of engine.

5. An engine synchronization system according to claim 2 in which said sensing means senses the compressor speed of each of said engines.

6. An engine synchronization system for a pair of turbo jet engines which produce a power output in a twin-engine aircraft comprising means fo selecting a power output, means for producing a first output signal in response to the speed of a first engine, means for producing a second output signal in response to the speed of said second engine, averaging means for averaging the speed of the engines and means for detecting differences in the average speed and the speed of each engine, and a servo driven throttle control, said servo driven throttle control comprising a first and a second servo motor and a shaft assembly including first and second output shafts with said first of said output shafts locked to said first of said servo motors and with said second of said output shafts locked to said second of said servo motors and wherein said output shafts are free to rotate with respect to one another for advancing and retarding the speed of each engine to match the average speed to thereby synchronize the speed of the engines, and which includes manual throttle control means for each of said engines disposed on said shafts and a sprag clutch disposed on each of said shafts for permitting said manual throttle control to rotate about the shaft without rotating the shaft and providing authority to the manual throttle control.

* * * * *